US009645287B2

(12) United States Patent
Brunner (10) Patent No.: US 9,645,287 B2
(45) Date of Patent: May 9, 2017

(54) FLEXIBLE OPTICAL APERTURE MECHANISMS (71) Applicant: KLA-Tencor Corporation, Milpitas, CA (US)

(72) Inventor: Rudolf Brunner, Mountain View, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 163 days.

(21) Appl. No.: 13/911,424

(22) Filed: Jun. 6, 2013

(65) Prior Publication Data

US 2014/0168740 A1    Jun. 19, 2014

Related U.S. Application Data (60) Provisional application No. 61/738,352, filed on Dec. 17, 2012.

(51) Int. Cl.
*G02B 5/00* (2006.01)
*G02B 26/02* (2006.01)
*G02B 26/06* (2006.01)

(52) U.S. Cl.
CPC .............. *G02B 5/005* (2013.01); *G02B 26/02* (2013.01); *G02B 26/06* (2013.01)

(58) Field of Classification Search
CPC ......... G02B 26/06; G02B 5/005; G02B 26/02
USPC .......................... 359/227–236, 510, 738–739
See application file for complete search history.

(56) References Cited

U.S. PATENT DOCUMENTS

| 3,671,754 | A | * | 6/1972 | Mundkur ...................... 250/236 |
| 5,642,456 | A | * | 6/1997 | Baker et al. ................... 385/140 |
| 5,970,168 | A |   | 10/1999 | Montesanto et al. |
| 2004/0218246 | A1 | * | 11/2004 | Onuki ..................... G02B 5/205 359/234 |
| 2006/0152810 | A1 |   | 7/2006 | Kvamme |
| 2006/0193059 | A1 | * | 8/2006 | Gutierrez ...................... 359/672 |
| 2008/0158552 | A1 |   | 7/2008 | Tokunaga et al. |
| 2009/0147247 | A1 |   | 6/2009 | Endo et al. |
| 2009/0232491 | A1 |   | 9/2009 | Masuda et al. |
| 2012/0243079 | A1 | * | 9/2012 | Bohm ...................... G02B 5/20 359/368 |

OTHER PUBLICATIONS

International Search Report and Written Opinion from PCT/US2013/075707, mailed Apr. 23, 2014, KLA-Tencor Corp., pp. 1-11.

* cited by examiner

*Primary Examiner* — Ricky Mack
*Assistant Examiner* — Kristina Deherrera
(74) *Attorney, Agent, or Firm* — Meyertons, Hood, Kivlin, Kowert & Goetzel, P.C.

(57) ABSTRACT

A system for providing flexible optical aperture shapes in an optical inspection system (e.g., an optical wafer inspection system) is described. The system includes one or more mechanisms for providing multiple optical aperture shapes along an optical beam path in the optical wafer inspection system. The multiple optical apertures shapes are stacked or overlapped to combine the shapes and form a single combined optical aperture shape along the optical beam path.

18 Claims, 12 Drawing Sheets

FLEXIBLE OPTICAL APERTURE MECHANISMS

PRIORITY CLAIM

This patent claims priority to U.S. Provisional Patent Application No. 61/738,352 filed Dec. 17, 2012, which is incorporated by reference in its entirety.

BACKGROUND

1. Field of the Invention

The present invention relates to optical wafer inspection systems. More particularly, the invention relates to apertures and shaping of the imaging path in optical wafer inspection systems.

2. Description of Related Art

Optical apertures with flexible sizes and/or shapes are useful in manipulating illumination and imaging properties in optical wafer inspection systems. Optical apertures with such flexibility allow illumination and imaging properties to be optimized given a selected wafer pattern and/or selected types of defects of interest. Varying sizes and shapes of optical apertures can be applied in both brightfield and darkfield optical modes. The use of special aperture sizes and/or shapes are also known to enhance signal to noise ratios in optical wafer inspection systems.

Thus, there is a need for flexible and programmable methods for selecting optical aperture sizes and/or shapes. In addition, the optical apertures may maximize optical transmission in the open portion (as close as possible to 100% transmission) for light transmission efficiency while minimizing optical transmission in the blocked portion (as close as possible to 0% transmission) to prevent light leakage. It may also be desired for the optical apertures to minimize stray light, minimize optical aberrations, withstand high optical power densities (e.g., from near infrared (NIR) to visible (VIS) to deep ultraviolet (DUV) to vacuum ultraviolet (VUV)), and inhibit contamination (especially in DUV and VUV optics). While the flexible optical apertures may be capable of providing fully open/fully blocked shapes, the apertures may also allow the inclusion of shaped optical elements with variably attenuating, polarizing, spectral, phase, and/or gradient properties (e.g., polarizing apertures, apodized apertures, dichroic apertures, or phase plates).

Figure 1:
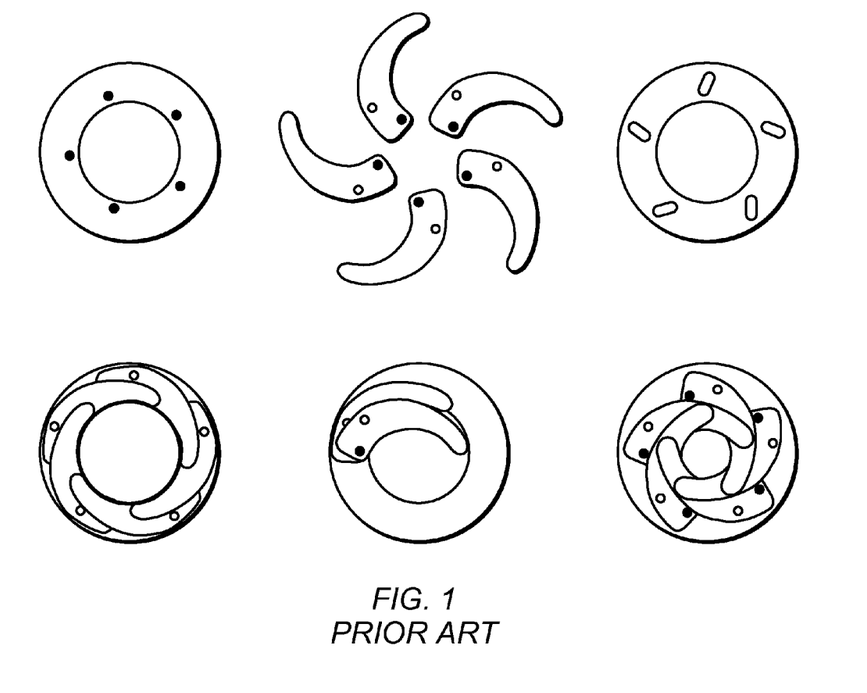
FIG. 1 depicts an example of an embodiment of an iris mechanism.

One method used for providing flexible optical apertures is an iris mechanism with adjustable blades, similar to apertures used in cameras or other optical instruments. FIG. 1 depicts an example of an embodiment of an iris mechanism. A base plate, blades, and a blade actuating ring are shown in the top row. The bottom row depicts three stages of blade adjustment—open position, blades in motion, and half-open position. In the iris mechanism, aperture size can be varied by moving the blades between the open position and a closed position. The shape of the aperture, however, is limited (e.g., typically the blades create an aperture approximating a circular aperture) and there is no allowance for the inclusion of optical elements in the iris mechanism.

Figure 2:
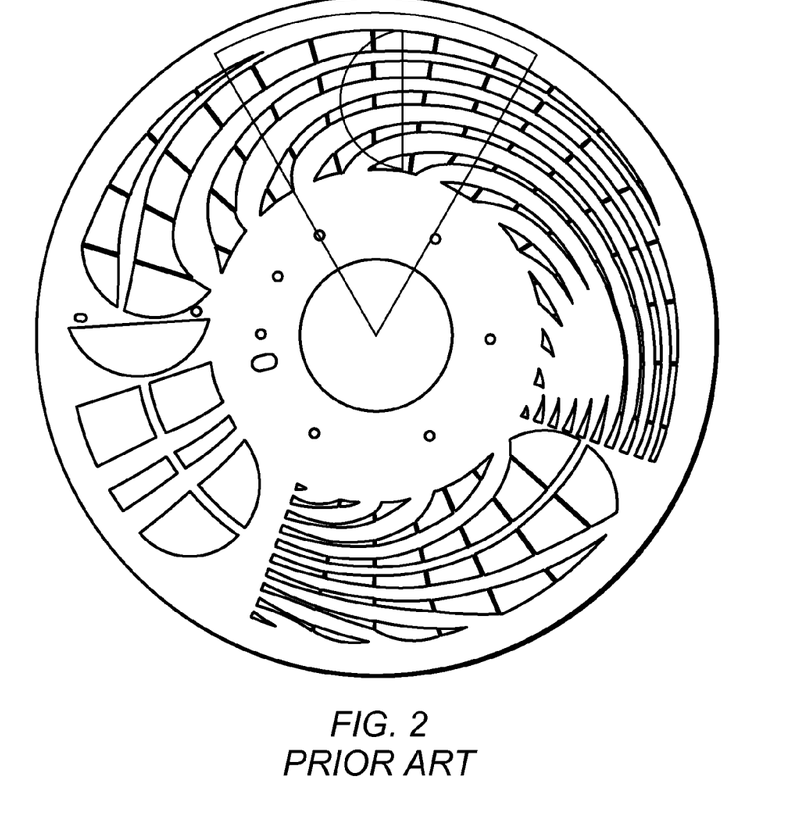
FIG. 2 depicts an example of an embodiment of an aperture wheel.

Another method used for providing flexible optical apertures is an aperture wheel (e.g., rotating aperture wheel). FIG. 2 depicts an example of an embodiment of an aperture wheel. The wheel shown in FIG. 2 includes multiple apertures that can be rotated into position to define the illumination. The number of types of shapes that can be accessed on the wheel, however, is limited by the apertures on the wheel.

Figure 3:
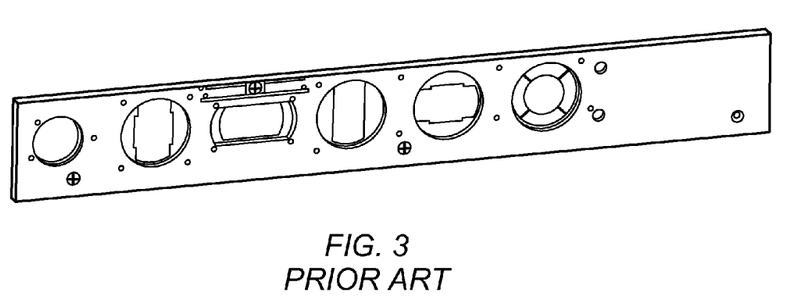
FIG. 3 depicts an example of an embodiment of a linear slider with multiple apertures used for providing flexible optical apertures.
Figure 4:
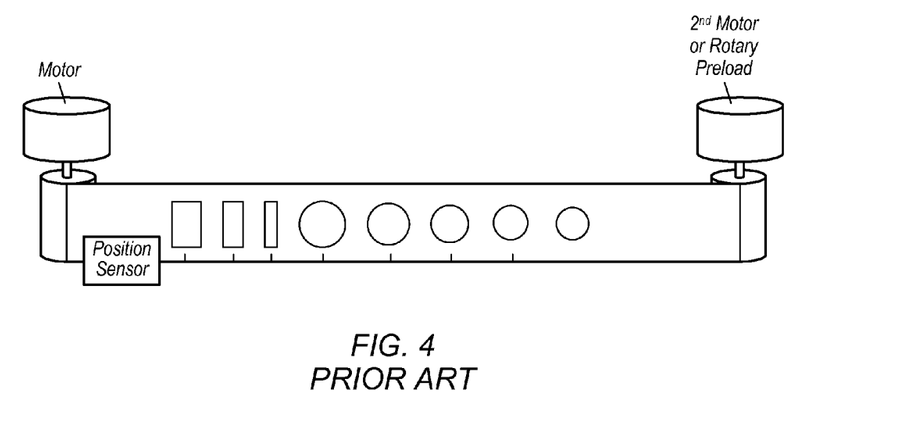
FIG. 4 depicts an example of an embodiment of a tape drive with multiple apertures used for providing flexible optical apertures.

FIG. 3 depicts an example of an embodiment of a linear slider with multiple apertures used for providing flexible optical apertures. The linear slider can be moved (e.g., slid) to place an aperture in position to define the illumination. FIG. 4 depicts an example of an embodiment of a tape drive with multiple apertures used for providing flexible optical apertures. The tape drive includes a thin tape with apertures that is rotated using reels on both ends of the tape to position a selected aperture to define the illumination. Similar to the aperture wheel, the number of types of shapes that can be accessed on the linear slider or the tape drive, however, is limited by the apertures on the slider or the tape drive.

Liquid crystal arrays (e.g., matrices) have been used for providing flexible optical apertures. Liquid crystal arrays, however, do not allow full open transmission or full blocking of light, which leads to inefficiency and/or light leakage. Liquid crystal arrays also cause stray light and/or scatter light, cause optical aberrations, and may provide poor transmission and/or limited lifetime at short wavelengths (e.g., UV, DUV, and VUV).

Tilt mirror arrays have been used for providing flexible optical apertures. Tilt mirror arrays, however, do not allow full open transmission, which causes inefficiency. In addition, tilt mirror arrays can cause stray or scattered light, cause optical aberrations, and/or can have limitations on light power density or contamination with DUV light. Tilt mirror arrays also may not allow efficient incorporation of shapes with spectral, polarizing, or phase properties.

Aperture patterns have been exposed and developed on photofilm systems. Photofilm systems, however, do not allow fully open and fully blocked transmission, require time for exposure and development, and have a low damage threshold. Photofilm systems may also degrade and cause contamination when used with UV, DUV, or VUV light systems and may not allow efficient incorporation of shapes with spectral, polarizing, or phase properties.

Aperture patterns have also been applied onto transmissive substrates using inkjet printing. Inkjet printing systems, however, does not allow full open transmission and requires substrate recleaning or a consumable substrate. Inkjet printing systems may also have a low damage threshold and degrade or cause contamination when used with UV, DUV, or VUV light systems. Inkjet printing systems also may not allow efficient incorporation of shapes with spectral, polarizing, or phase properties.

Fourier filters (e.g., plurality of metal bars with adjustable spacing) have also been used for providing flexible optical apertures. U.S. Pat. No. 5,970,168, which is incorporated by reference as if fully set forth herein, describes an example of a Fourier filter. Fourier filters, however, allow for very few shapes and are only mostly useful to block diffraction patterns.

Yet another system for providing flexible optical apertures is the use of a microshutter array. For example, an array of microelectromechanical system shutters may allow for full programmability of pixels (such as those used on the James-Webb space telescope). Microshutter arrays, however, may not allow full open transmission due to the array structure and the array structure may cause stray light. Microshutters are also complex in nature which can add cost and reduce reliability.

As described above, previous flexible optical aperture systems have several disadvantages including, but not limited to, disadvantages such as optical transmission losses, incomplete optical blocking, straylight, optical aberrations, limited shape flexibility or spatial resolution, low damage threshold and DUV incompatibility, limited flexibility to incorporate additional optical features (such as apodization, phase plates, shaped polarizers, and spectral apertures), and incompatibility with existing optical systems. Thus, there is still a need for programmable and adjustable (e.g., flexible) optical aperture systems and methods that provide high optical transmission in combination with complete optical blocking, no optical aberrations, and minimal stray light while allowing incorporation of attenuation apertures, phase apertures, spectral apertures, and polarizing apertures. In addition, the flexible optical aperture systems and methods may have a high damage threshold and compatibility with various optical systems (e.g., UV, DUV, VUV, and EUV optics).

SUMMARY

In certain embodiments, a system for providing a combined optical aperture shape in an optical inspection system includes a plurality of optical apertures and a mechanism for individually positioning two or more of the optical apertures in a stacked configuration along an optical beam path in the optical inspection system. The stacked optical apertures may be combined to provide a single combined optical aperture shape along the optical beam path. In some embodiments, at least two of the stacked optical apertures include different shapes. The single combined optical aperture shape may include a combination of the different shapes. In some embodiments, the plurality of optical apertures includes optical apertures with different shapes and the mechanism positions at least two optical apertures with different shapes in the stacked configuration along the optical beam path. In some embodiments, the plurality of optical apertures include optical apertures with varying attenuation, spectral, polarizing, and/or phase shift properties.

In certain embodiments, a system for providing a combined optical aperture shape in an optical inspection system includes a plurality of sheets of optical apertures with each sheet having one or more optical apertures and a mechanism for stacking the sheets such that at least one optical aperture on each sheet is aligned along an optical beam path in the optical inspection system. The aligned optical apertures may provide a single combined optical aperture shape along the optical beam path. The single combined optical aperture shape may include a combination of shapes of the optical apertures aligned along the optical beam path. In some embodiments, at least one sheet includes at least two optical apertures with different shapes and the mechanism allows a selected optical aperture shape on the at least one sheet to be positioned along the optical beam path. In some embodiments, the mechanism moves the sheets to align a selected optical aperture on each sheet along the optical beam path during use.

In certain embodiments, a method for providing a combined optical aperture shape in an optical inspection system includes providing a plurality of optical apertures to the optical inspection system. At least two optical apertures with different shapes may be stacked along an optical beam path in the optical inspection system. The at least two optical apertures with different shapes may be aligned along the optical beam path to provide a single combined optical aperture shape along the optical beam path. In some embodiments, the plurality of optical aperture shapes are provided on two or more sheets of optical aperture shapes. The sheets may be moved to align at least one selected optical aperture on each sheet along the optical beam path. The sheets may be stacked to stack the at least two optical apertures with different shapes along the optical beam path.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

Optical inspection systems (e.g., optical wafer inspection systems) may use optical apertures to define illumination and imaging paths in the optical inspection systems. While embodiments described herein are directed to providing optical apertures in optical wafer inspection systems, it is to be understood that the embodiments described may also be useful in other optical inspection and/or metrology systems. Examples of other optical systems include, but are not limited to, optical wafer metrology systems, optical mask inspection and metrology systems, solar panel inspection systems, hard disk inspection systems, lithography systems, and other optical inspection and measurement systems. Optical apertures with flexible sizes and/or shapes may be used to manipulate (e.g., determine or select) illumination and imaging properties in the optical wafer inspection system. In some embodiments, the illumination and imaging properties are optimized through selection of a desired size and/or shape for the optical aperture. The illumination and imaging properties may, for example, be optimized for a selected wafer pattern and/or selected types of defects.

Figure 5:
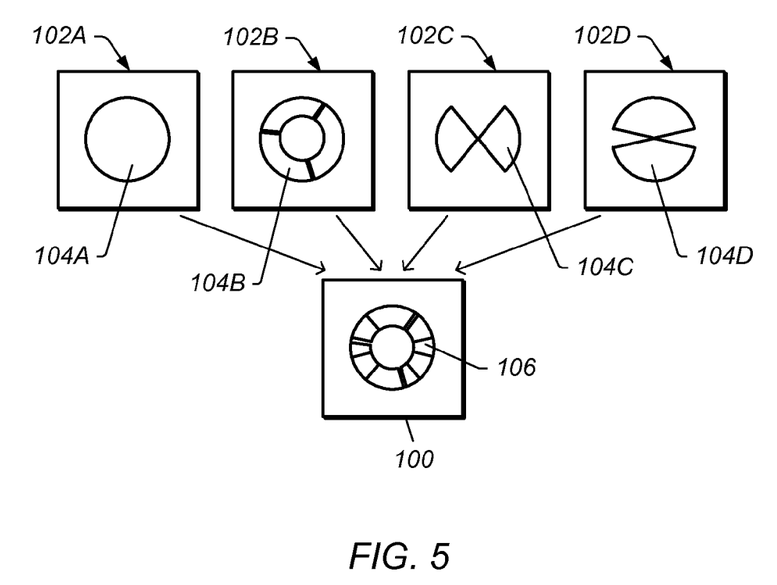
FIG. 5 depicts a schematic of an embodiment of a combined aperture formed from multiple individual apertures.
Figure 6:
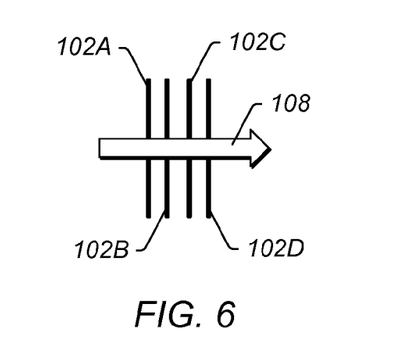
FIG. 6 depicts a side view of apertures stacked along an optical beam path.

In certain embodiments, multiple optical apertures (each with its own size and/or shape) are combined (e.g., stacked or overlapped) to produce a single aperture shape (e.g., a combined aperture shape). FIG. 5 depicts a schematic of an embodiment of combined aperture 100 formed from multiple individual apertures 102A-D. Apertures 102A-D may each have different shaped openings 104A-D shapes. As shown in FIG. 5, the combination of openings 104A-D forms combined opening 106 in combined aperture 100. In certain embodiments, combined aperture 100 is formed by stacking (or overlapping) apertures 102A-D linearly along the optical beam path. FIG. 6 depicts a side view of apertures 102A-D stacked along optical beam path 108.

In certain embodiments, an optical wafer inspection system includes a mechanism that provides multiple sheets (e.g., N number of sheets) with multiple aperture shapes per sheet (e.g., M number of apertures per sheet). Sheets may be, for example, aperture wheels with multiple apertures, linear sliders with multiple apertures, linear tapes with multiple apertures, or any other component with multiple apertures that can be moved (e.g., rotated or translated) to position a selected aperture in an optical beam path.

The mechanism may position the sheets such that one selected aperture on each sheet is positioned along the optical beam path. Thus, the combination of the selected apertures on each of the sheets produces a single combined aperture shape along the optical beam path. For example, as shown in FIG. 5, apertures 102A-D may each be on individual sheets and each individual sheet may be moved to select the appropriate aperture (e.g., apertures 102A-D) and produce combined aperture 100. Because of the multiple (N) sheets with multiple (M) aperture shapes on each sheet (e.g., aperture 102A is one of multiple aperture shapes on an individual sheet), the mechanism may provide up to M×N different individual aperture shapes, and up to $M^N$ combined (stacked) aperture shapes.

In certain embodiments, the apertures on the sheets have varying attenuation (optical transmission), polarizing, spectral, and/or phase properties. In some embodiments, each property is varied on each sheet (e.g., each aperture on an individual sheet provides a different variation of the selected property). For example, one sheet may vary attenuation (with each aperture on the sheet providing different attenuation) while another sheet varies polarization (with each aperture on the sheet providing different polarization). Varying the properties on the sheets allows for manipulation of attenuation, polarizing, spectral, and/or phase properties as a function of lateral position in the optical beam path. In addition, the properties may be varied in a flexible manner using the individual sheets.

An example of variation in attenuation, polarizing, spectral, and phase properties may be provided with reference to apertures 102A-D, depicted in FIG. 5. In one embodiment, aperture 102A provides variable transmission properties, aperture 102B provides varying spectral properties, aperture 102C provides varying polarizing properties, and aperture 102D provides varying phase properties. For example, aperture 102A may provide approximately 100% optical transmission in opening 104A and approximately 0% transmission outside the opening (e.g., the optical transmission varies across the aperture). Aperture 102B may provide approximately 100% optical transmission in opening 104B with the center dot inside the opening acting as a spectral filter (e.g., the spectral transmission varies across the aperture). For aperture 102C, opening 104C provides an unpolarized light transmission path while the area outside the opening provides a polarizing transmission light path (e.g., the polarization varies across the aperture). Similarly, opening 104D in aperture 102D provides no phase shift while the area outside the opening provides a phase shift (e.g., the phase varies across the aperture). Thus, the combination of apertures 102A-D provides combined aperture 100 with selected attenuation (transmission), spectral, polarizing, and phase shift properties based on the opening patterns in each individual aperture.

The mechanism providing multiple sheets with multiple aperture shapes per sheet, as described above, may provide many advantages when used in an optical wafer inspection system. For example, the mechanism significantly increases the number of aperture shapes available (e.g., M×N) aperture shapes while maintaining the benefits of single aperture wheel mechanisms such as approximately 100% light transmission and approximately 100% light blocking without optical aberrations. The multiple sheet, multiple aperture shape mechanism may also minimize straylight with suitable finishes and geometry (shape) of apertures, have a high damage threshold with regards IR to EUV wavelength light, and be compatible with many different light systems (e.g., IR, VIS, DUV, VUV, and EUV systems) in both vacuum and ultra high purity environments.

FIGS. 7-16 depict various embodiments of mechanisms that provide multiple sheets with multiple aperture shapes per sheet for use in providing an optical aperture used in an optical wafer inspection system. It is to be understood that the embodiments depicted herein are provided as examples of mechanisms that may be used and that variations of the embodiments would be apparent to those skilled in the art in view of the described embodiments. For example, one or more features found in one embodiment may be applied to another embodiment.

Figure 7:
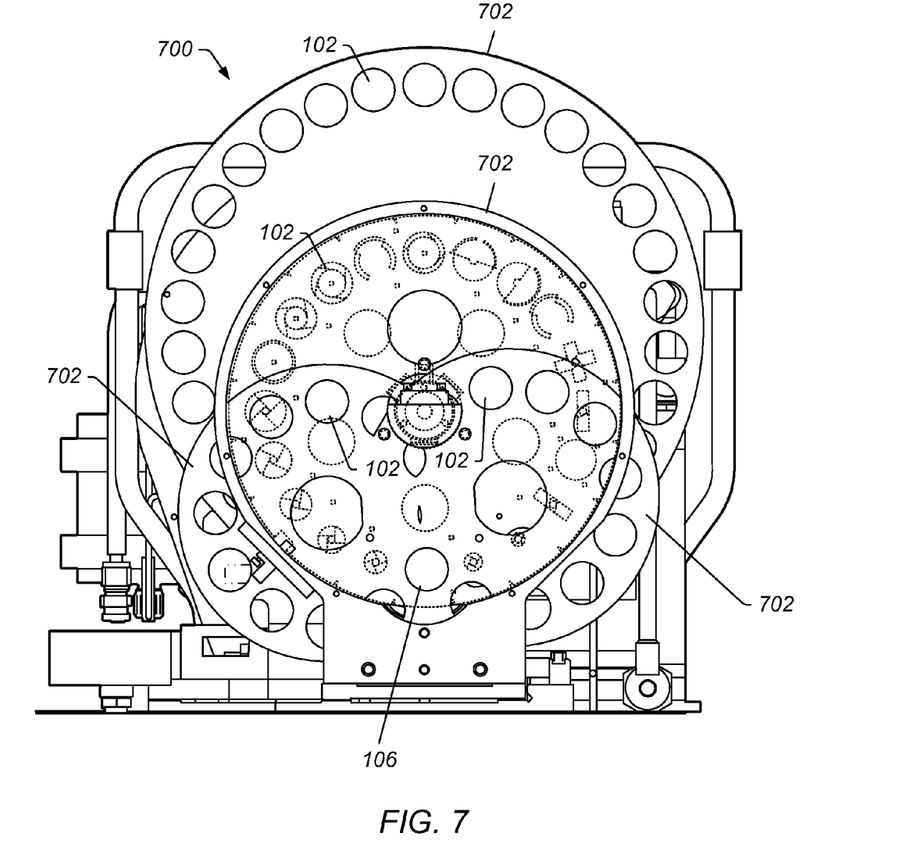
FIG. 7 depicts a front view of an embodiment of a mechanism that provides multiple sheets with multiple aperture shapes per sheet.

FIG. 7 depicts a front view of an embodiment of mechanism 700 that provides multiple sheets with multiple aperture shapes per sheet. Mechanism 700 includes multiple disks 702 with multiple apertures 102 on each disk. Disks 702 may be, for example, wheels or sheets of apertures 102. In the embodiment depicted in FIG. 7, four disks 702 are shown as an example. It is to be understood, however, the number of disks may vary based on a desired number and/or combination of aperture properties.

In certain embodiments, disks 702 have separate (individual) axes of rotation (e.g., each disk rotates around a different rotational axis). Each disk 702 may be individually actuated (rotated). Disks 702 may be rotated to place a selected aperture on each disk in the path of an optical beam through mechanism 700. Apertures 102 on disks 702 overlap at the location the optical beam passes through mechanism 700. Apertures 102 overlap to form combined aperture 106 at the location the optical beam passes through mechanism 700. Combined aperture 106 has an effective aperture shape defined by the overlap of apertures 102 on each disk 702.

Figure 8:
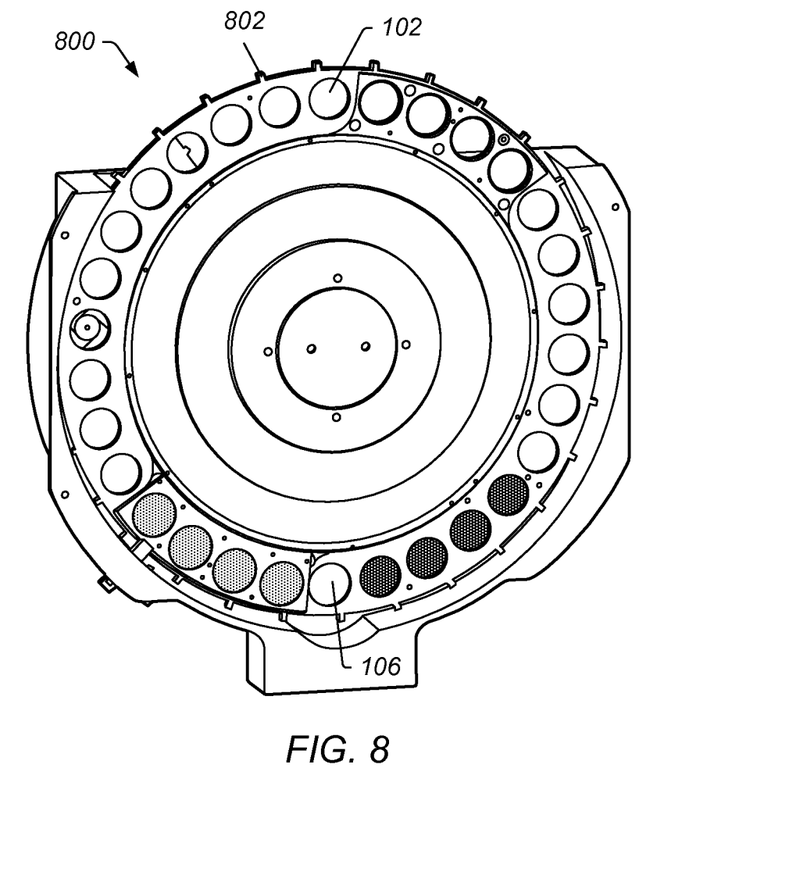
FIG. 8 depicts a front view of a second embodiment of a mechanism that provides multiple sheets with multiple aperture shapes per sheet.
Figure 9:
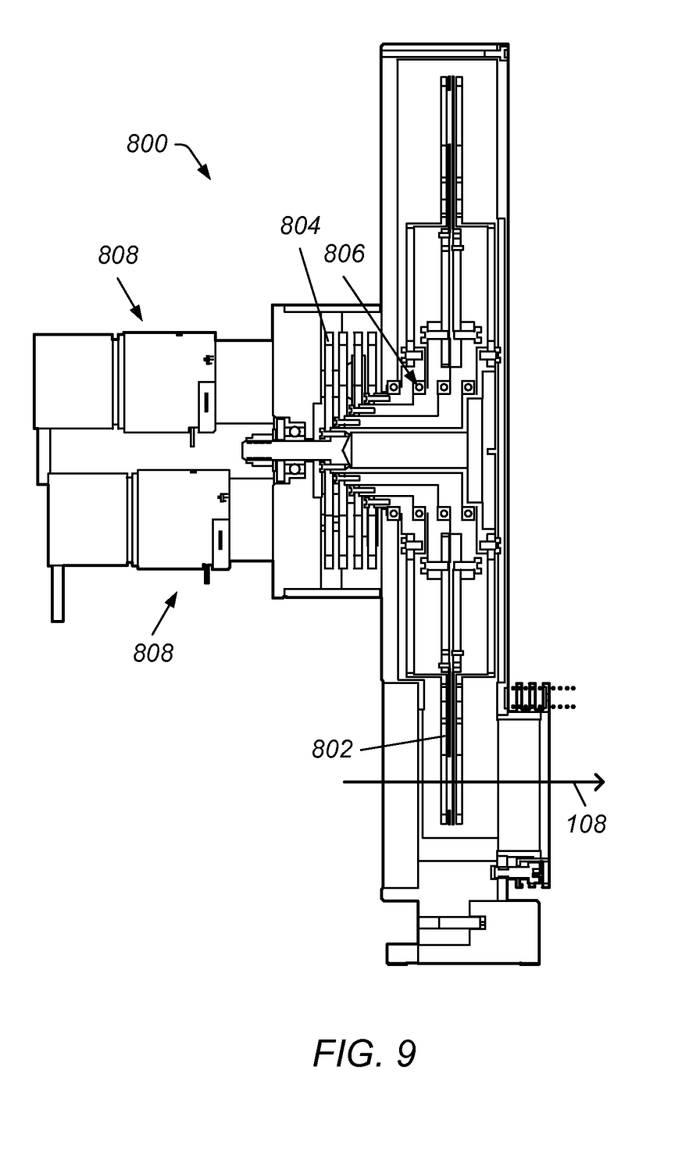
FIG. 9 depicts a cross-sectional side view of the second embodiment of the mechanism.

FIGS. 8 and 9 depict an embodiment of mechanism 800 that provides multiple sheets with multiple aperture shapes per sheet. FIG. 8 depicts a front view of an embodiment of mechanism 800. FIG. 9 depicts a cross-sectional side view of an embodiment of mechanism 800. Mechanism 800 includes multiple disks 802 with multiple apertures 102 on each disk. Disks 802 may be, for example, wheels or sheets of apertures 102. Disks 802 may be made of high temperature alloys. In the embodiment depicted in FIGS. 8 and 9, four disks 802 are shown as an example. It is to be understood, however, the number of disks may vary based on a desired number and/or combination of aperture properties.

In certain embodiments, disks 802 are coaxial (e.g., share the same axis of rotation). A gear and bearing system may be used to allow disks 802 to rotate along the same axis. Gears 804 and bearings 806 may be coupled to disks 802. In certain embodiments, mechanism 800 includes one gear 804 and one bearing 806 for each disk 802. Gears 804 may be operated by motors 808 with one motor for each gear. Using individual motors 808 to rotate individual disks 802 may reduce or eliminate backlash with gear preload (e.g., anti-backlash movement) in mechanism 800. Bearings 806 may be used to inhibit friction between gears 804 and/or disks 802 and inhibit wobbling of the disks.

Motors 808 may be used to rotate (through gears 804 and bearings 806) disks 802 individually to move a selected aperture on each disk into optical beam path 108. In some embodiments, motors 808 rotate disks 802 substantially simultaneously. Apertures 102 on disks 802 may overlap along optical beam path 108 through mechanism 800. Apertures 102 overlap to form combined aperture 106 at the location of optical beam path 108. Combined aperture 106 has an effective aperture shape defined by the overlap of apertures 102 on each disk 802.

In certain embodiments, disks 802 have a minimum clearance between the disks to allow for individual (uninhibited) rotation of the disks. For example, a 1-2 mm clearance may be required between disks 802 to allow uninhibited rotation of the disks. In some embodiments, disks 802 include position sensing components to allow remote sensing of the location of apertures on each disk. Position sensing components may include, for example, opto-sensors and/or flags on the disks. In some embodiments, one disk 802 (e.g., the first disk closest to the front side of mechanism 800) includes reflectors while the other disks are flat. In some embodiments, the first and last disks (e.g., the end disks) include slots for special materials such as glass.

Figure 10:
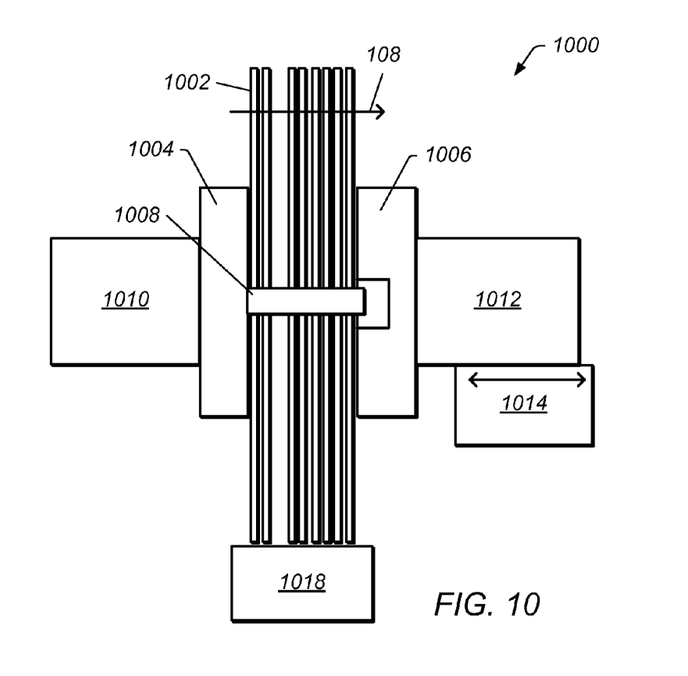
FIG. 10 depicts a side view representation of a third embodiment of a mechanism that provides multiple sheets with multiple aperture shapes per sheet.
Figure 11:
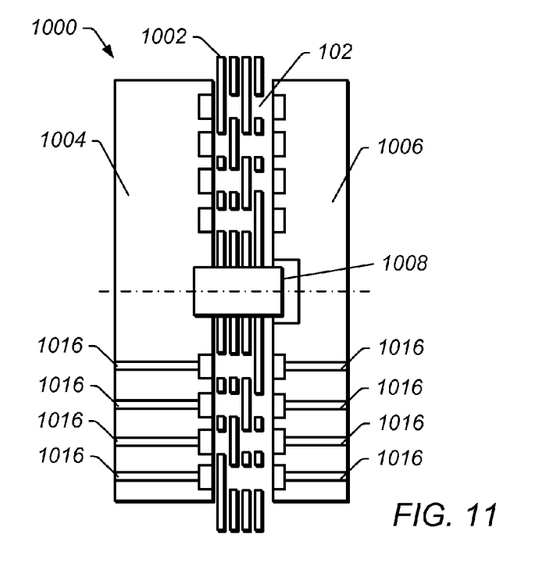
FIG. 11 depicts an enlarged side view of the third embodiment of the mechanism.

FIGS. 10 and 11 depict an embodiment of mechanism 1000 that provides multiple sheets with multiple aperture shapes per sheet. FIG. 10 depicts a side view representation of an embodiment of mechanism 1000. FIG. 11 depicts an enlarged side view of an embodiment of mechanism 1000. Mechanism 1000 includes multiple disks 1002 with multiple apertures 102 on each disk. Disks 1002 may be, for example, wheels or sheets of apertures 102.

In certain embodiments, mechanism 1000 includes hub 1004 and hub 1006 on opposite sides of disks 1002. Pin 1008 may locate disks 1002 between hubs 1004, 1006. Pin 1008 may be, for example, a center pin or bearing along the axis of rotation of disks 1002. Hub 1004 may clamp and rotate disks 1002 from the left side of the disks. Motor 1010 may be used to rotate hub 1004 and disks 1002 coupled to the hub. Hub 1006 may clamp disks 1002 from the right side of the disks. In some embodiments, hub 1006 may rotate disks (e.g., using motor 1012). Motor 1012 may be replaced (in cases with no rotation) by a static support for hub 1006.

Hub 1006 may be translated left/right using translation stage 1014. Translation of hub 1006 allows hub 1006 to handoff (transfer) disks 1002 from being coupled to hub 1006 to being coupled to hub 1004. Vacuum rings 1016 in hubs 1004, 1006 may be used to couple (e.g., e disk from the hub). Other coupling (clamping) mechanisms are also possible such as mechanical or magnetic coupling systems.

During operation, hub 1006 may move to the left, be coupled to disks 1002 (e.g., all the disks), and moved to the right (away from hub 1004) along with the disks. Rotation of the disks may be checked using sensor 1018. Sensor 1018 may include one or more rotation sensors such as, but not limited to, parallel throughbeams, single throughbeams with encoding schemes, linear CCDs, or other cameras.

To rotate disks 1002 and select appropriate apertures to place in optical beam path 108, hub 1006 moves, with disks 1002, to the left towards hub 1004. Hub 1004 couples to the first disk 1002 and rotates the first disk to the proper orientation to place a selected aperture in optical beam path 108. Sensor 1018 may be used to ensure proper rotation of the first disk 1002. This process may be repeated with each successive disk until all disks 1002 are in proper orientation to provide a combined aperture along optical beam path 108.

Figure 12:
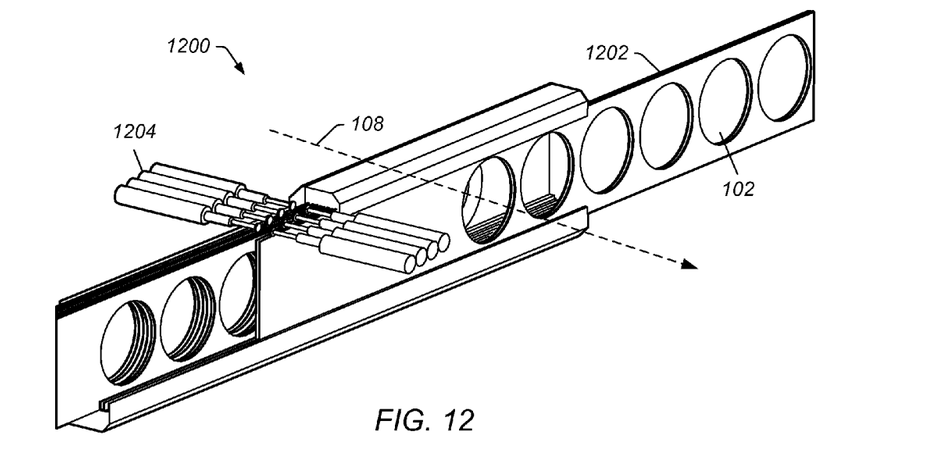
FIG. 12 depicts a fourth embodiment of a mechanism that provides multiple sheets with multiple aperture shapes per sheet.

FIG. 12 depicts an embodiment of mechanism 1200 that provides multiple sheets with multiple aperture shapes per sheet. Mechanism 1200 includes multiple linear sheets 1202 with multiple apertures 102 on each sheet. Sheets 1202 may be, for example, linear sliders with multiple apertures 102 on each slider. Sheets 1202 may be moved linearly to align selected apertures on the sheets in optical beam path 108 and provide a desired combined aperture along the optical beam path.

Figure 13:
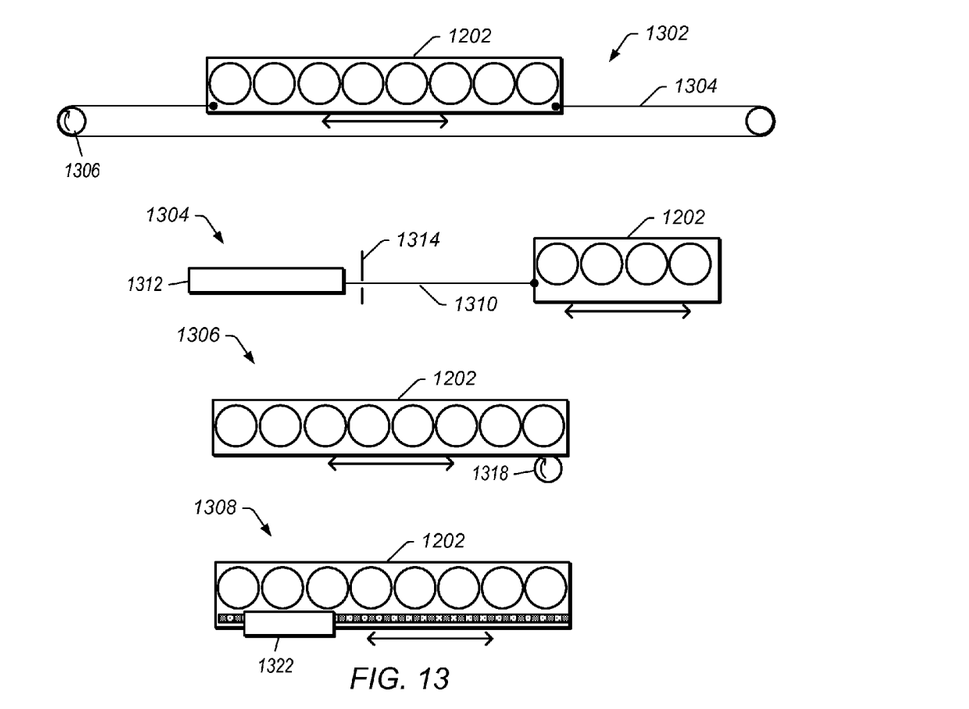
FIG. 13 depicts embodiments of alternative drive mechanisms for sheets.

In certain embodiments, sheets 1202 are guided using bearings 1204 (e.g., roller, sliding, or air bearings). In some embodiments, a motor with a rack and pinion is used to translate (slide) sheets 1202 back and forth linearly along the bearings to select the aperture for each sheet. Other drive (translation) mechanisms may also be used. FIG. 13 depicts embodiments of alternative drive mechanisms for sheets 1202. Drive mechanism 1302 includes cable 1304 and motor 1306 to move sheet 1202. Drive mechanism 1308 includes push rod 1310 driven by linear actuator 1312 to move sheet 1202. Push rod 1310 may be fed into the optical wafer inspection system through feedthrough 1314. Drive mechanism 1316 includes roller drive 1318 to move sheet 1202. Drive mechanism 1320 includes linear motor 1322 to move sheet 1202.

Figure 14:
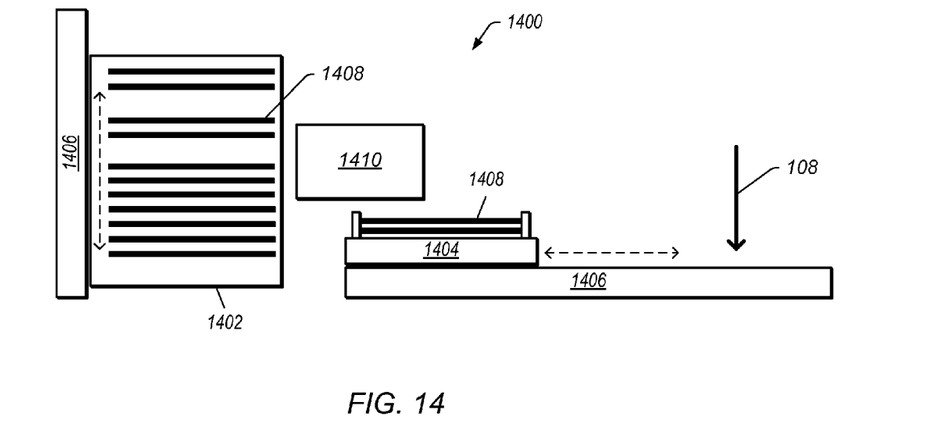
FIG. 14 depicts a fifth embodiment of a mechanism that provides multiple sheets with multiple aperture shapes per sheet.

FIG. 14 depicts an embodiment of mechanism 1400 that provides multiple sheets with multiple aperture shapes per sheet. Mechanism 1400 includes aperture holder 1402 and aperture carrier 1404. Both holder 1402 and carrier 1404 may be coupled to linear slide and actuators 1406 to move the holder and the carrier, as shown by the arrows in FIG. 14. Aperture plates 1408 may be stored in holder 1402. Holder 1402 may be, for example, a cassette type holder of aperture plates (similar to a juke box for holding records). Aperture plates 1408 may include one or more apertures on each plate.

Movement of holder 1402 up/down using actuator 1406 allows aperture plates 1408 to be selected and grasped by transfer mechanism 1410. Transfer mechanism 1410 may then transfer the selected aperture plate to carrier 1404. Transfer mechanism 1410 may include mechanical, vacuum, magnetic, or other types of gripping mechanisms to grasp and release aperture plates 1408 as needed. For example, transfer mechanism 1410 may be an articulating arm with a vacuum chuck to grasp and release aperture plates 1408.

Aperture plates 1408 may be stacked in carrier 1404, as shown in FIG. 14. In some embodiments, aperture plates 1408 are registered while being stacked in carrier 1404 (e.g., apertures on the plates are identified and logged). In embodiments in which aperture plates 1408 include more than one aperture, the aperture plate may be rotated or translated to provide a selected aperture in a selected location to be used for providing the combined aperture from the stack of aperture plates. After aperture plates 1408 are stacked in carrier 1404, the carrier may be translated to move the aperture plates (and the combined aperture) into optical beam path 108 for use in the optical wafer inspection system.

In some embodiments, aperture plates 1408 are rotated after stacking to allow for variable angular position. In some embodiments, aperture plates 1408 are shifted in one or two directions before stacking to allow for variable widths and lengths in the apertures and the combined aperture. Providing such additional degrees of freedom of movement increases the flexibility of mechanism 1400 in generating desirable shapes for the combined aperture.

Figure 15:
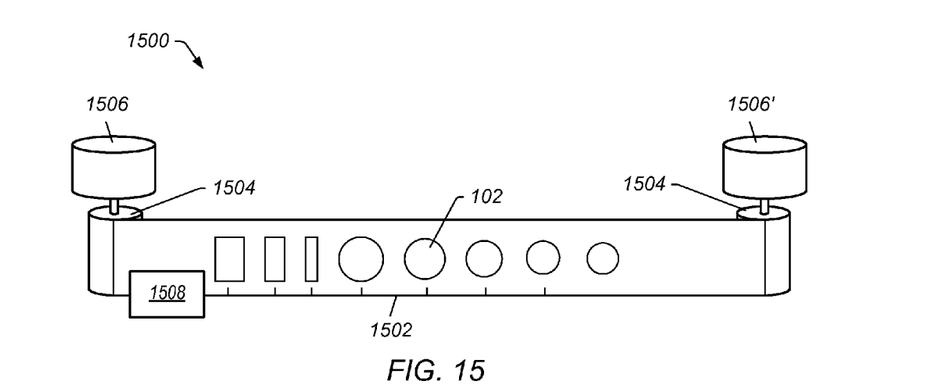
FIG. 15 depicts a front view of a sixth embodiment of a mechanism that provides multiple sheets with multiple aperture shapes per sheet.
Figure 16:
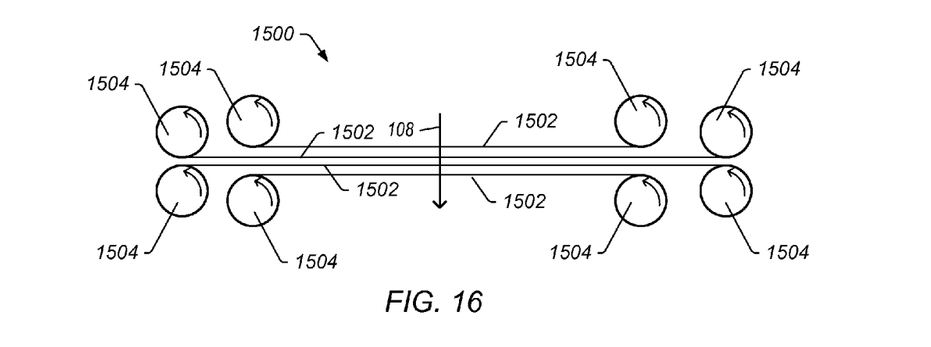
FIG. 16 depicts a top view of the sixth embodiment of the mechanism.

FIGS. 15 and 16 depict an embodiment of mechanism 1500 that provides multiple sheets with multiple aperture shapes per sheet. FIG. 15 depicts a front view of an embodiment of mechanism 1500. FIG. 16 depicts a top view of an embodiment of mechanism 1500. Mechanism 1500 includes one or more tapes 1502 of apertures 102. Tapes 1502 may be relatively thin tapes with minimal thickness such that the tapes can be positioned in close proximity to each other, as shown in FIG. 16. Reels 1504 may be located at ends of tapes 1502. Reels 1504 may be used to wind and unwind tapes 1502 from the reels as the reels are moved to provide a selected aperture in optical beam path 108.

At least one motor 1506 is coupled to one of reels 1504 at the end of each tape 1502. Motor 1506 may be used to wind and unwind tape 1502 from reels 1504. In some embodiments, second motor 1506' is used on the reel at the other end of the tape. In some embodiments, a rotary preload is provided instead of second motor 1506'. Reels 1504 and motors 1506 may be used to linearly translate tapes 1502 and position selected apertures 102 in optical beam path 108 to provide a desired combined aperture in the optical beam path. Position sensor 1508 may be used to identify and track which apertures 102 are positioned in optical beam path 108.

In some embodiments, guide rollers may be provided on either side of tapes 1502 to support and guide the tapes as they are wound and unwound from reels 1504. Because of the minimal thickness of tapes 1502, it may be difficult to provide apertures with varying attenuation, polarization, spectral, and phase properties on the tapes.

The embodiments of mechanisms described in FIGS. 7-16 provide automatic mechanisms for quickly providing multiple and flexible varieties of apertures for use in optical wafer inspection systems. The mechanisms described reduce or eliminate the need for special aperture shape fabrication and manual installation of such special aperture shapes. Automating the mechanisms for providing the apertures reduces fabrication lead times and wafer inspection tool downtimes, thus reducing costs and manufacturing time. Additionally, having multiple aperture shapes readily available and configurable (using the multiple sheets with multiple apertures) within an optical wafer inspection system allows methods and automated algorithms for determination of an optimal aperture shape given a certain use case (e.g., a selected wafer pattern and/or selected types of defects).

FIGS. 17-20 depict examples of various aperture families that may be provided on different disks, sheets, or tapes to provide desired combined aperture shapes. In the examples depicted in FIGS. 17-20, four sheets of apertures are shown. It is to be understood, however, that any number of sheets of apertures may be used as needed or desired. In addition, it is to be understood that any variation of apertures may be used and that any apertures shown on one sheet may be used on another sheet or on multiple sheets as needed.

Figure 17:
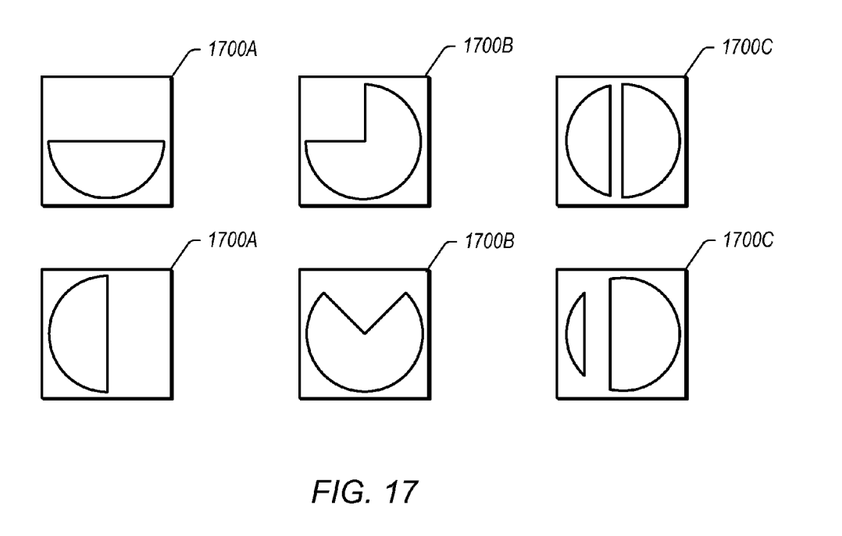
FIG. 17 depicts an example of various apertures that may be included on a first sheet of apertures.

FIG. 17 depicts an example of various apertures 1700 that may be included on a first sheet of apertures. Apertures 1700 may include, for example, half block apertures 1700A, quarter block apertures 1700B, and bar block apertures 1700C. In some embodiments, the blocks in apertures 1700 are moved (e.g., rotated or moved laterally) to form variations of apertures, as shown in FIG. 17.

Figure 18:
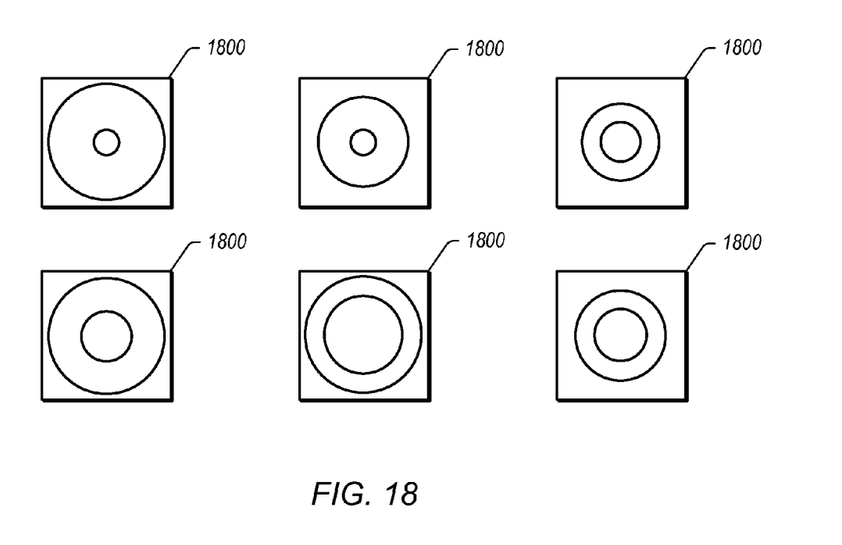
FIG. 18 depicts an example of various apertures that may be included on a second sheet of apertures.

FIG. 18 depicts an example of various apertures 1800 that may be included on a second sheet of apertures. Apertures 1800 may include ring shaped apertures. In some embodiments, the size of the rings in apertures 1800 are varied, as shown in FIG. 18.

Figure 19:
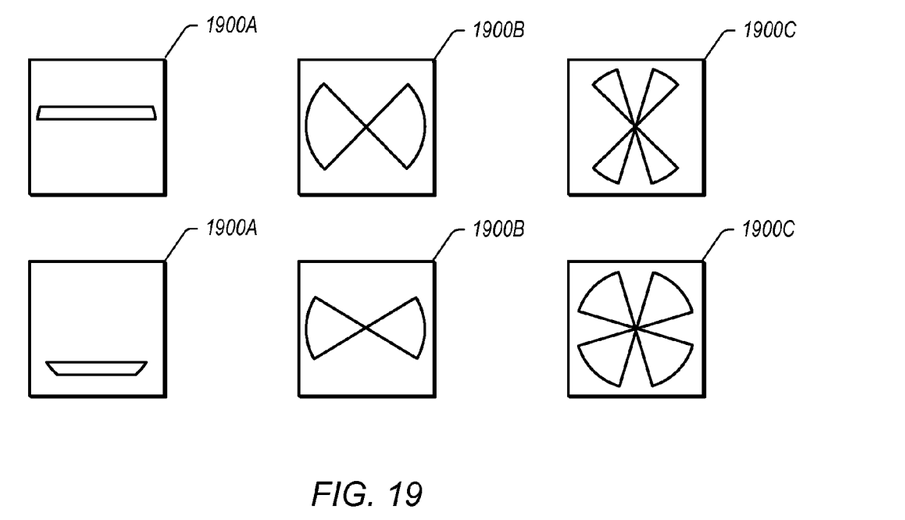
FIG. 19 depicts an example of various apertures that may be included on a third sheet of apertures.

FIG. 19 depicts an example of various apertures 1900 that may be included on a third sheet of apertures. Apertures 1900 may include slot apertures 1900A and open sector apertures 1900B, 1900C. Slot apertures 1900A may include X-slot apertures (shown in FIG. 19) or Y-slot apertures. Open sector apertures 1900B, 1900C may include apertures with symmetrical open sectors.

Figure 20:
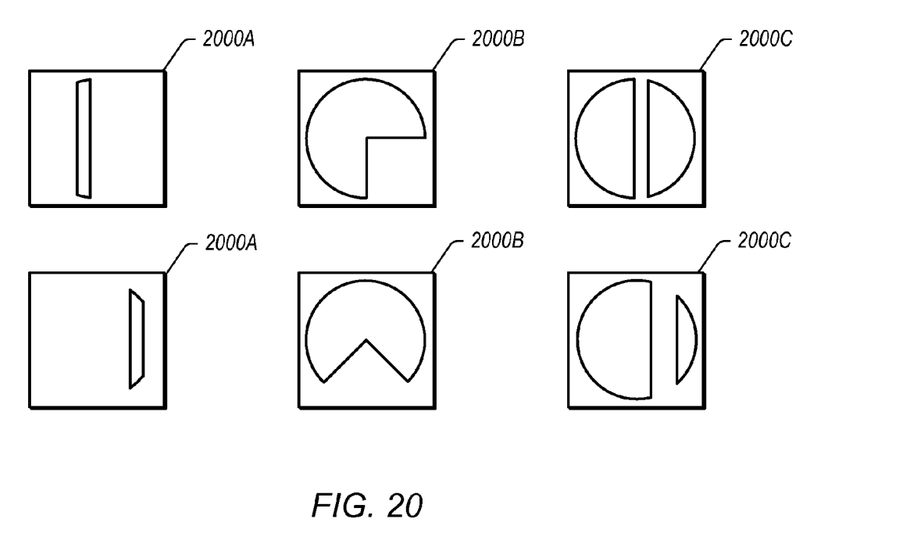
FIG. 20 depicts an example of various apertures that may be included on a fourth sheet of apertures.

FIG. 20 depicts an example of various apertures 2000 that may be included on a fourth sheet of apertures. Apertures 2000 may include, for example, slot apertures 2000A, quarter block apertures 2000B, and bar block apertures 2000C. In some embodiments, the blocks in apertures 2000 are moved (e.g., rotated or moved laterally) to form variations of apertures, as shown in FIG. 20.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a shaft" includes a combination of two or more shafts and reference to "a light" includes mixtures of lights.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for providing a combined optical aperture shape in an optical inspection system, comprising:
    a plurality of optical apertures having a plurality of different shaped, enclosed openings;
    wherein two or more of the optical apertures with different shaped, enclosed openings are configured to be independently moved into a static position in a stacked configuration along an optical beam path in the optical inspection system, wherein the different shaped, enclosed openings in the two or more optical apertures combine to form a single combined, enclosed opening shape along the optical beam path, the single combined, enclosed opening shape having a shape that is different than a shape of any of the different shaped, enclosed openings in the two or more optical apertures combined to form the single combined, enclosed opening shape.

2. The system of claim 1, wherein at least two of the two or more stacked optical apertures comprise different shaped, enclosed openings.

3. The system of claim 1, wherein the optical apertures are located on two or more sheets of optical apertures, and wherein the two or more sheets are independently moved to position the two or more optical apertures in the stacked configuration along the optical beam path.

4. The system of claim 1, wherein the different shaped, enclosed openings of the two or more stacked optical apertures overlap to provide the single combined, enclosed opening shape along the optical beam path.

5. The system of claim 1, wherein the plurality of optical apertures comprises optical apertures with varying attenuation, spectral, polarizing, and/or phase shift properties.

6. The system of claim 1, wherein the two or more stacked optical apertures with different shaped, enclosed openings are stacked linearly along the optical beam path.

7. A system for providing a combined optical aperture shape in an optical inspection system, comprising:
    a plurality of sheets of optical apertures, wherein each sheet comprises one or more optical apertures, the optical apertures having different shaped, enclosed openings, wherein at least one sheet comprises at least two optical apertures with different shaped, enclosed openings, wherein at least two sheets comprise different shaped, enclosed openings with varying optical properties on the at least two sheets, and wherein the optical property varied by the different shaped, enclosed openings on a first sheet of the at least two sheets is different than the optical property varied by the different shaped, enclosed openings on a second sheet of the at least two sheets;
    wherein the sheets are configured to be independently moved into static positions and stacked such that at least one optical aperture with a selected shaped, enclosed opening on each sheet is aligned along an optical beam path in the optical inspection system when in the static positions, and wherein the aligned optical apertures with the selected shaped, enclosed openings combine to form a single combined, enclosed opening shape along the optical beam path, the single combined, enclosed opening shape having a shape that is different than a shape of any of the selected shaped, enclosed openings combined to form the single combined, enclosed opening shape.

8. The system of claim 7, wherein the at least one sheet is positionable to select a shaped, enclosed opening on the at least one sheet to be positioned along the optical beam path.

9. The system of claim 7, wherein the sheets are independently moved to align a selected shaped, enclosed opening on each sheet along the optical beam path during use.

10. The system of claim 7, wherein at least one of the at least two sheets comprises different shaped, enclosed openings with varying attenuation properties on the sheet.

11. The system of claim 7, wherein at least one of the at least two sheets comprises different shaped, enclosed openings with varying spectral properties on the sheet.

12. The system of claim 7, wherein at least one of the at least two sheets comprises different shaped, enclosed openings with varying polarizing properties on the sheet.

13. The system of claim 7, wherein at least one of the at least two sheets comprises different shaped, enclosed openings with varying phase shift properties on the sheet.

14. The system of claim 7, wherein the sheets are stacked along the optical beam path such that the selected shaped, enclosed openings on each sheet are stacked linearly along the optical beam path.

15. A method for providing a combined optical aperture shape in an optical inspection system, comprising:
    providing a plurality of optical apertures to the optical inspection system on two or more sheets of optical apertures, the optical apertures having a plurality of different shaped, enclosed openings, wherein at least one sheet comprises at least two optical apertures with different shaped, enclosed openings, wherein at least two sheets comprise different shaped, enclosed openings with varying optical properties on the at least two sheets, and wherein the optical property varied by the different shaped, enclosed openings on a first sheet of the at least two sheets is different than the optical property varied by the different shaped, enclosed openings on a second sheet of the at least two sheets;
    independently moving at least two optical apertures with different shaped, enclosed openings into a static position and a stacked configuration along an optical beam path in the optical inspection system; and
    aligning, in the static position, the at least two optical apertures with different shaped, enclosed openings along the optical beam path to combine the different shaped, enclosed openings and form a single combined, enclosed opening shape along the optical beam path, the single combined, enclosed opening shape having a shape that is different than a shape of any of the different shaped, enclosed openings in the two or more optical apertures combined to form the single combined, enclosed opening shape.

16. The method of claim 15, further comprising moving the sheets to align at least one selected optical aperture shaped, enclosed opening on each sheet along the optical beam path.

17. The method of claim 15, further comprising stacking the sheets to stack the at least two optical apertures with different shaped, enclosed openings along the optical beam path.

18. The method of claim 15, wherein the at least two optical apertures with different shaped, enclosed openings in the stacked configuration are aligned linearly along the optical beam path.

* * * * *